United States Patent
Caban Babilonia et al.

(10) Patent No.: US 12,166,639 B2
(45) Date of Patent: Dec. 10, 2024

(54) NETWORK POWER BUDGET OPTIMIZED SCHEDULING OF APPLICATIONS

(71) Applicant: Red Hat, Inc., Raleigh, NC (US)

(72) Inventors: William J. Caban Babilonia, Columbia, MD (US); Rimma Iontel, New York, NY (US); David Kypuros, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/975,687

(22) Filed: Oct. 28, 2022

(65) Prior Publication Data
US 2024/0146612 A1    May 2, 2024

(51) Int. Cl.
| | |
|---|---|
| G06F 15/173 | (2006.01) |
| H04L 41/12 | (2022.01) |
| H04L 41/16 | (2022.01) |
| H04L 43/04 | (2022.01) |
| H04L 43/08 | (2022.01) |

(52) U.S. Cl.
CPC ............ *H04L 41/12* (2013.01); *H04L 41/16* (2013.01); *H04L 43/04* (2013.01); *H04L 43/08* (2013.01)

(58) Field of Classification Search
CPC .......... H04L 41/12; H04L 41/16; H04L 43/08
See application file for complete search history.

(56) References Cited

U.S. PATENT DOCUMENTS

| | | |
|---|---|---|
| 8,677,161 B2 | 3/2014 | Barsness et al. |
| 8,942,113 B2 | 1/2015 | Venuto |

(Continued)

FOREIGN PATENT DOCUMENTS

| | | |
|---|---|---|
| CN | 102063327 B | 7/2013 |
| CN | 102289277 B | 12/2013 |

OTHER PUBLICATIONS

Zhang, Huazhe; "Maximizing Performance in Distributed Systems with a Power Budget", Chameleon, Oct. 15, 2019, Accessed: Aug. 19, 2022, 4 Pages https://www.chameleoncloud.org/blog/2019/10/15/maximizing-performance-distributed-system-power-budget/.

(Continued)

*Primary Examiner* — Padma Mundur
(74) *Attorney, Agent, or Firm* — Kilpatrick Townsend & Stockton LLP (57) ABSTRACT

The present disclosure provides new and innovative systems and methods for optimizing networks for the scheduling and execution of applications. An example method includes identifying a plurality of clusters network devices associated with a network. For each cluster and for each network device, a respective set of hardware constraints are determined. Furthermore, applications associated with each cluster may be determined. For each application associated with each cluster, application interactions and a set of application constraints may be determined. The application interactions may occur between applications associated with different clusters and may include a first application interaction between a first application associated with a first cluster and a second application associated with a second cluster. The method further includes generating a modification to the first application interaction, wherein the modification optimizes the network based on an optimization criteria.

20 Claims, 5 Drawing Sheets

(56) References Cited

U.S. PATENT DOCUMENTS

| | | | |
|---|---|---|---|
| 10,429,921 B2 | 10/2019 | Potlapally et al. | |
| 2011/0307290 A1* | 12/2011 | Rolia | G06Q 10/0631 705/7.12 |
| 2017/0139462 A1* | 5/2017 | Potlapally | G06F 11/3062 |
| 2022/0209943 A1* | 6/2022 | Syrivelis | H04L 63/061 |

OTHER PUBLICATIONS

Berral, et al. "Adaptive Scheduling on Power-Aware Managed Data-Centers using Machine Learning" Universitat Politecnica de Catalunya and Barcelona Supercomputing Center, Accessed Oct. 28, 2022. 11 Pages https://www.irjet.net/archives/V5/i5/IRJET-V5I5945.pdf.

Kiran B.R. et al. "Scheduling Schemes for Optimizing Energy and Cost in Cloud Computing", May 2018, vol. 05, Issue 05, pp. 4242-4246, e-ISSN: 2395-0056, p-ISSN: 2395-0072, Impact Factor value: 6.171, ISO 9001:2008 Certified Journal, International Research Journal of Engineering and Technology (IRJET), Nitte Meenakshi Institute of Technology, Bangalore, 5 Pages.

\* cited by examiner

NETWORK POWER BUDGET OPTIMIZED SCHEDULING OF APPLICATIONS

BACKGROUND

Multi-node computer system networks continue to be used to facilitate application processes and interactions spanning multiple computer system nodes and network devices. Application processes and interactions spanning the network may include a plurality of applications, which may each be assigned to or executed at different nodes of the network. However, there may be more than one pathway by which applications may interact between different nodes of the network, and there may be more than one node that can manage or execute any given application or application process. Each computer system node may comprise individual computer systems with hardware constraints (e.g., related to its communication bandwidth, processors, and/or memory) and/or may comprise multi-access edge computing (MEC) cluster. Multi-access edge computing (MEC) is a type of network architecture that provides cloud computing capabilities and an IT service environment at the edge of a network. An MEC cluster may thus provide computer systems and/or computer system resources closer to a user or operator associated with a specific application or application process managed by the MEC cluster. The specific interactions between and/or use of different nodes of the network for the execution or scheduling of an application significantly contributes to the power consumed by the network.

SUMMARY

The present disclosure provides new and innovative systems and methods for network optimization for the scheduling and execution of applications. In an example, a system for network optimization includes a processor and a memory. The memory may store instructions that, when executed by the processor, cause the process to perform one or more processes. For example, the processor may identify a plurality of clusters and one or more network devices associated with a network. For each of the plurality of clusters and for each of the one or more network devices, the processor may determine a set of hardware constraints. For each cluster, the processor may determine one or more applications associated with the cluster. For each of the one or more applications associated with each cluster, the processor may determine one or more application interactions and a set of application constraints. Furthermore, the one or more application interactions occur between applications associated with different clusters. The one or more application interactions may include a first application interaction between a first application associated with a first cluster and a second application associated with a second cluster. The instructions, when executed, may further cause the processor to generate a modification to the first application interaction, wherein the modification optimizes the network based on an optimization criteria.

In some embodiments, prior to identifying the plurality of clusters and the one or more network devices, a request to optimize one or more application processes in the network based on the optimization criteria may be received. The optimization criteria may include, for example an optimization of a performance of one or more application processes in the network; and/or an optimization of power consumption caused by the one or more application processes in the network.

In some embodiments, an association of any given application with any given cluster provides the given cluster an authority to execute the given application. In some aspects, a modification to an application interaction (e.g., the modification to the first application interaction) may cause a reduction of power consumed by the network, and/or an enhancement of a performance metric of one or more application processes in the network. For example, the modification may reassign the first application from having the association with the first cluster to having an association with the second cluster. Also or alternatively, the modification may reassign a pathway corresponding to the first application from a first pathway to a second pathway, wherein the first pathway traverses a first set of network devices of the network and the second pathway traverses a second set of network devices of the network that is different from the first set of network devices.

In an example, a method for network optimization is disclosed. The method may include: identifying, by a computing device having a processor, a plurality of clusters and one or more network devices associated with a network; determining, for each cluster and for each of the one or more network devices, a set of hardware constraints; determining, for each cluster, one or more applications associated with the cluster; determining, for each of the one or more applications associated with each cluster, one or more application interactions and a set of application constraints, wherein the one or more application interactions occur between applications associated with different clusters, wherein the one or more application interactions includes a first application interaction between a first application associated with a first cluster and a second application associated with a second cluster; and generating a modification to the first application interaction, wherein the modification optimizes the network based on an optimization criteria.

In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

As previously discussed, multi-node computer system networks continue to be used to facilitate application processes and interactions spanning multiple computer system nodes and network devices. The specific application processes and interactions between different nodes of the network for the execution or scheduling of applications significantly contribute to the power consumed by the network, among other resources that are expended by the network. Without an efficient way to map, reassign, and/or distribute application processes and interactions across the different nodes or pathways of the network environment, computer system networks may continue to suffer from increased power consumptions and other wastage of resources. There is thus a desire and need for an effective way to optimize application processes and interactions occurring across a network, for example, to reduce power consumption by the network.

The present disclosure describes solutions for effectively optimizing networks (e.g., multi-node networks comprising a plurality of multi-edge computing (MEC) clusters and network devices) by modifying application processes and interactions occurring across the network, which may reap the aforementioned benefits of reduced power consumption of the network and/or the better alignment of resources provided by individual nodes of the network. For example, when considering holistic power optimization on a system (e.g. accounting for available compute resources, applications, networks elements in the path between applications interacting among themselves, etc.), an optimization can be achieved by taking into account the interactions between different applications running or executing on different nodes and the power consumption of the network elements in the path among them. In an example embodiment, a network orchestrator of the network may, for a given interaction between applications occurring across the network, may determine the power consumed by the current path of the application interaction between different nodes of the network, the compute resources available (e.g., at each node), and the use of microservices during the execution of an application. The network may determine (e.g., by determining the power consumed by alternate paths, the compute resources at alternate nodes, and alternate use of other resources) a re-scheduling of applications (e.g., at alternate nodes, or via alternate pathways) so they have the least impact in the overall power consumption of the system.

Figure 1:
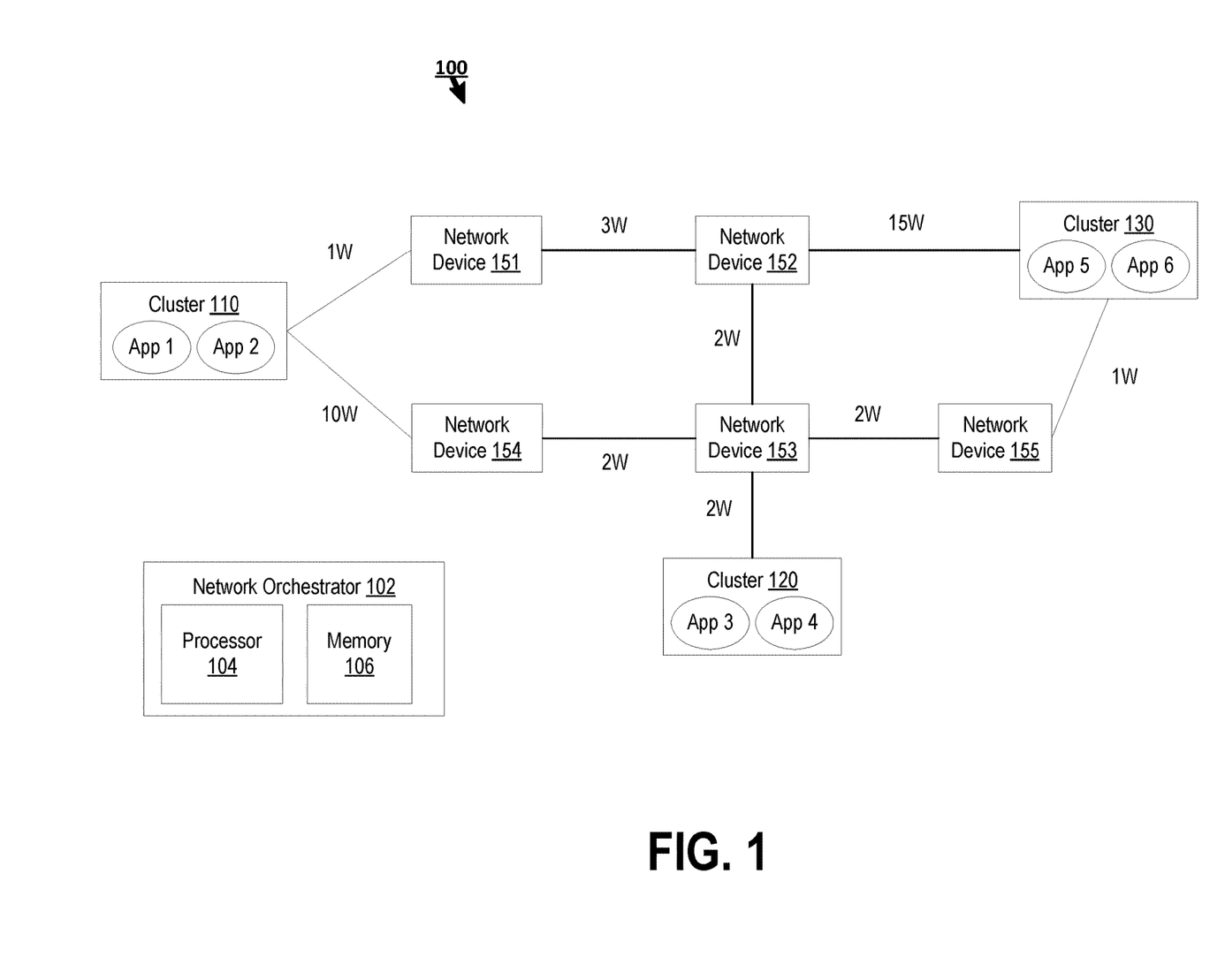
FIG. 1 is a block diagram of an example network environment for the optimization of application processes and interactions occurring across the network, according to an example embodiment of the present disclosure.

FIG. 1 is a block diagram of an example network environment 100 for the optimization of application processes and interactions occurring across the network, according to an example embodiment of the present disclosure. The network environment may be representative of a large multi-node computing system environment spanning a geography (e.g., a country, region, or wide area network) and may comprise a plurality of nodes, clusters, network devices, or network edges. For example, as shown in FIG. 1, the network environment 100 may include a plurality of clusters (e.g., clusters 110, 120, and 130) that may be able to communicate through pathways in the network via a plurality of network devices (e.g., network devices 151-155).

The network environment 100 may further include a network orchestrator 102. The network orchestrator 102 (e.g., a network controller, a network administration system, a network monitoring system, etc.) may include a server, a computing system, or a node (e.g., that is promoted or elected to serve as a network orchestrator) that stores or tracks the compute resources of other nodes, application processes and interactions occurring across the network, and power consumption or resource use patterns (e.g., based on pathways taken for application interactions between applications running or executing on nodes across the network). Moreover the network orchestrator 102 may perform processes for optimizing the network, as described herein. The network orchestrator may include a processor 104 and a memory 106. The processor 104 may comprise any one or more types of digital circuit configured to perform operations on a data stream, including functions described in the present disclosure. The memory 106 may comprise any type of long term, short term, volatile, nonvolatile, or other memory and is not to be limited to any particular type of memory or number of memories, or type of media upon which memory is stored. Furthermore, the memory 106 may store computer-executable instructions that, when executed by the processor 104, can cause the processor 104 to perform one or more processes described herein.

Each node may have one or more applications associated with it. An association with an application may cause the node to perform at least one or more processes of the application using compute resources or other capabilities of the node. Also or alternatively, the association may involve the node as at least one segment of the pathway that an application interaction takes between applications running or executing on different nodes of the network. For example, as shown in FIG. 1, cluster 100 may be associated with applications 1 and 2 (e.g., App 1 and App 2), cluster 120 may be associated with applications 3 and 4 (e.g., App 3 and App 4), and cluster 130 may be associated with applications 5 and 6 (e.g., App 5 and App 6).

A cluster (e.g., clusters 110-130) may comprise a set of computers or computer systems assigned to perform a function or common set of functions. Such clusters may rely on compute resources that are on premise, on cloud, or hybrid (e.g., a multi-access edge computing (MEC) cluster). Furthermore, the nodes and/or clusters may take different architectures (e.g. x86, Advanced RISC Machine (ARM), etc.). Systems and methods described herein may can apply scheduling and/or rescheduling of applications associated with these nodes to optimized power consumption and/or other resource usage, taking into account metrics from multiple domains (e.g. network path, compute node power utilization, etc.).

The network devices (e.g., network devices 151-155) may comprise electronic devices and/or systems to facilitate communication (e.g., data transmission) and interaction between the various nodes (e.g., clusters) of the network 100. Each network device may add further constraints and/or capabilities for applications utilizing pathways on which the network device sits. For example, there may be more power consumed when an application (e.g., a first application) on one node (e.g., a first node) interacts with another application (e.g., a second application) on another node (e.g., a second node) that are communicatively linked along a given pathway (e.g., a first pathway) via a given network device (e.g., a first network device) than when the first application interacts with the second application linked along another pathway (e.g., a second pathway) via another network device (e.g., a second network device).

In an example process, application App 1, associated with cluster 110 may be identified (e.g., by detection) to have regular interactions with application App 5, associated with cluster 130. For example, cluster 110, cluster 130, App 1, App 5, and/or the network orchestrator 102 may have a stored definition for applications App 1 or App 5 as interacting with one another. Also or alternatively, as will be discussed further herein, a machine learning (ML) model may be used to detect application interactions, for example, of App 1 being likely to interact with App 5. In some embodiments, the detection of these application interactions may be performed by the network orchestrator 102.

A scheduling system (e.g., network orchestrator 102) can take this into consideration for the initial instantiation of the workloads on the same cluster (e.g., by de-scheduling App 1 so that it occurs at cluster 130, along with App 5). The execution of applications App 1 and App 5 at the same cluster, cluster 130 may thus reduce the power consumption associated with the interaction between cluster 110 and cluster 130. Furthermore, in order for cluster 130 to devote its compute resources for the execution of applications App 1 and App 5, the network orchestrator 102 may reassign one or more applications from their association to cluster 130 to associations with other clusters that have the capability to execute such applications. For example, App 6 may be de-scheduled so that it is executed at cluster 110 instead of cluster 130.

In the above described example, if it is found that applications App 1 and App 5 cannot both be executed in cluster 130 (e.g. due to there not enough resources or incompatible architectures), then the scheduling system (e.g., network orchestrator 102) can use the identified power budget of the network pathways to identify the best locations (e.g., clusters) for the execution of the respective applications. For example, the App 1 may be rescheduled to cluster 120. In order to allow cluster 120 to devote its compute resources for App 1, App 3 may be reassigned to cluster 110.

In some embodiments, a given application (e.g., App 2) may be determined to have a high load of interaction during certain events with another application (e.g., App 3). The determination may be based on a definition of the application (e.g., stored in the network orchestrator 102) or based on detection using an ML model. The events may correspond to, for example, a time of day, when a number of sessions for either application being executed on a given system reaches a certain predetermined load, or when a certain type of service is consumed (e.g., 5G slicing services, etc.). Furthermore, the given application (e.g., App 2) may also have a high level of interaction with yet another application (e.g., App 4) in other conditions (e.g. different time of day, when a different type of service is being used, etc.). In such embodiments, a scheduling system (e.g., the network orchestrator 102) for system-wide power optimization, can take the power budget of a network path combined with node-level and cluster-level metrics, to proactively perform an in-time rescheduling and/or reassignment of the applications (e.g., App 2, App 3, and App 4) to achieve the best-optimized power consumption within the application constraints. In some aspects, the scheduling system may rely on ML models that are trained based on high load interaction patterns in the network.

Figure 2:
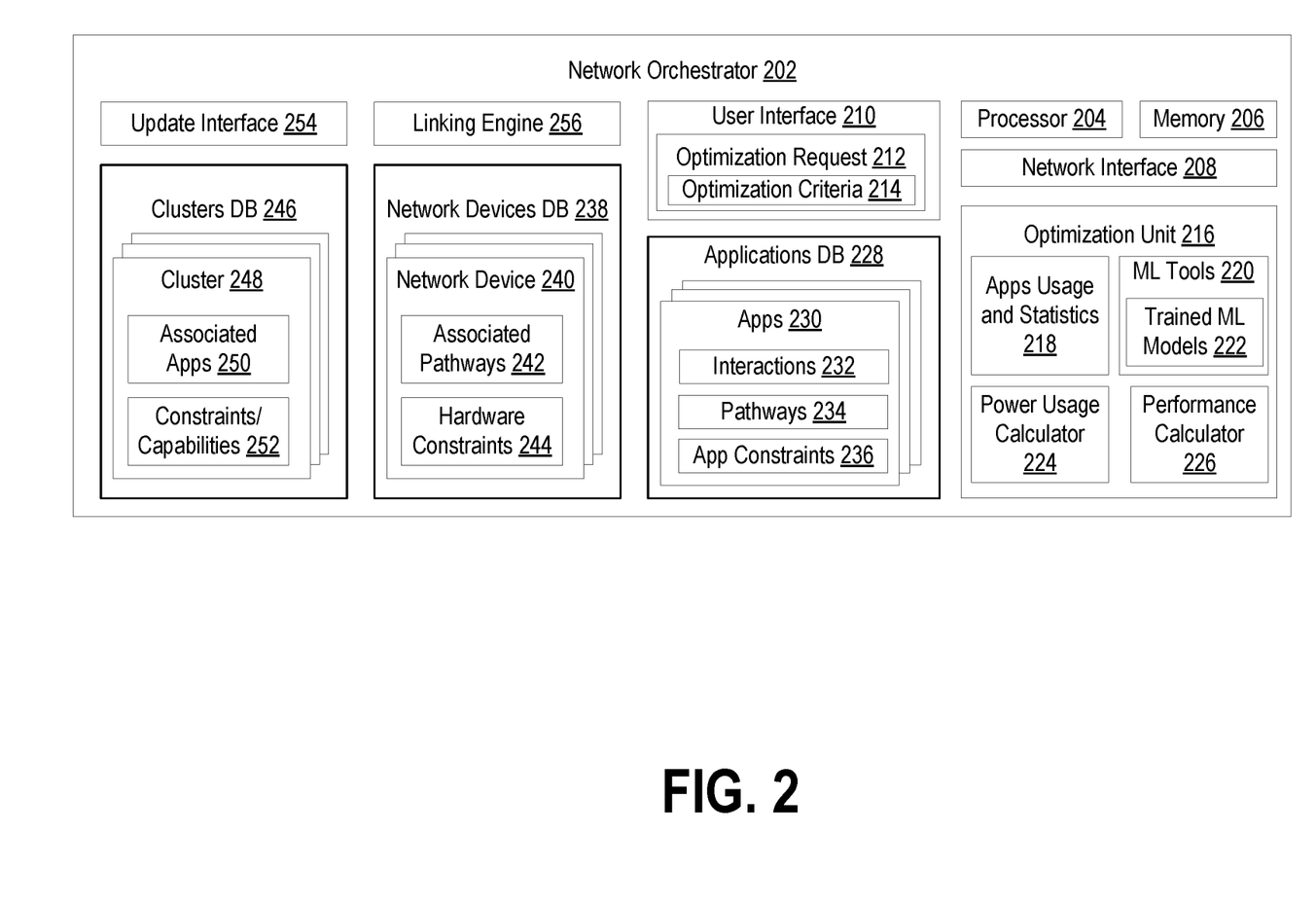
FIG. 2 is a block diagram showing one or more components of an example network orchestrator, according to an example embodiment of the present disclosure.

FIG. 2 is a block diagram showing one or more components of an example network orchestrator 202 of a network, according to an example embodiment of the present disclosure. As previously discussed, the network orchestrator 202 (e.g., network orchestrator 102 of FIG. 1) may comprise a server, a computing system, or another node of the network (e.g., a node that is promoted or elected by peer nodes to serve as the network orchestrator) that stores or tracks the compute resources of other nodes, application processes, and application interactions occurring across the network, and power consumption or resource use patterns (e.g., based on pathways taken by the application processes across the network). Moreover the network orchestrator 102 may perform processes for optimizing the network, as described herein. As shown in FIG. 2, the network orchestrator 202 may comprise a memory 206, a processor 204, a network interface 208 a user interface 210, an optimization unit 216, a plurality of databases storing pertinent information about the network that the network orchestrator optimizes (e.g., clusters database 246, network devices database 236, and applications database 228), an update interface 254, and a linking engine 256.

The processor 204 may comprise any one or more types of digital circuit configured to perform operations on a data stream, including functions described in the present disclosure. The memory 206 may comprise any type of long term, short term, volatile, nonvolatile, or other memory and is not to be limited to any particular type of memory or number of memories, or type of media upon which memory is stored. Furthermore, the memory 206 may store computer-executable instructions that, when executed by the processor 204, can cause the processor 204 to perform one or more processes described herein. The network interface 208 may allow the network orchestrator 202 to communicate with other nodes (e.g., clusters) and/or network devices of the computer systems network. For example, the network interface 208 may comprise a wired interface (e.g., electrical, radiofrequency (RF) (e.g., via a coaxial cable), optical interface (via fiber)), a wireless interface, a modem, etc. In some aspects, the nodes of the network may also each have a respective network interface to facilitate communication with one another (e.g., to facilitate application interactions).

The user interface 210 may comprise a portal allowing a user or operator of the systems and methods discussed herein for optimizing a network to enter information setting constraints, configurations, or special requests for the optimization of the network. For example, a user or operator may use the user interface 210 to input an optimization request 212 to optimize a network or portion of a network based on an optimization criteria 214. The optimization criteria 214 may include, for example, an optimization based on power consumption, an optimization based on the usage of a specific network or compute resource, or an optimization based on aligning application processes to nodes most capable or best equipped to manage or execute such processes.

The optimization unit 216 may be any portion or entirety of a software, application, program, or plug-in that causes the network orchestrator 202 to optimize a network managed by the network orchestrator 202 (e.g., based on an optimization criteria 214). The optimization unit 216 may store historical and/or predictive statistical information associated with the usage, interactions, and/or processes associated with each application occurring across the network (e.g., apps usage and statistics 218). Furthermore, the optimization unit 216 may include or rely on machine learning applications, functions, or libraries (e.g., ML tools 220) to train and store machine learning models (e.g., trained ML models 222). The machine learning models may be trained using training data obtained from historical application usage and statistics to predict future application usage and/or statistics, or future application interactions across the network. Also or alternatively, the machine learning models may be trained using training data obtained from the power usage, a resource usage, and/or performance associated with historical application interactions or processes to determine a power usage, a resource usage, and/or a performance associated with an alternative and/or a forecasted application interaction or process. For example, the training may comprise of feature vectors corresponding to historical application usage, statistics, interactions, and/or processes, which may be associated with (e.g., labeled to) an outcome (e.g., a power usage, a resource usage, a performance) to undergo supervised learning. The optimization unit 216 may further include a power usage calculator 224 and a performance calculator 226. The power usage calculator 224 may be used to determine predicted power usage or consumption, for example, as a result of a modification to one or more application processes or interactions. In some embodiments, for example, where an optimization criteria is based on an optimization of another network resource (e.g., bandwidth, memory, etc.), a usage or consumption of that network resource can also be calculated (e.g., based on an alternate application process or interaction) for network optimization. The performance calculator 226 may be used to determine predict a performance metric (e.g., speed, accuracy, reliability, etc.) of an application, for example, as a result of a modification to one or more application processes or interactions.

The network orchestrator 202 may further include a plurality of databases that may include an applications database 228, a network devices database 238, and a clusters database 246. The applications database 228 may be a database, repository, or list of a plurality of applications 230 in the network. The processes of each application may occur across the network. As used herein, an application process may refer to an aspect or portion of the application (e.g., an instruction or workload of the application) to be executed, for example, by a given node of the network. An application may have (e.g., as part of its definition and/or configuration) interactions 232 one or more other applications running, executing, and/or otherwise associated with one or more other respective nodes of the network. As used herein, an interaction 232 may refer to a collaboration or transfer of information between two or more different applications to perform a process associated with any of the applications. The two or more different applications may be associated with different nodes across the network. For example, an interaction may involve a first application associated with a first node interacting with a second application associated with a second node for the fulfillment of a process of the first application. Furthermore, based on interactions 232 with one or more nodes of the network, applications may be associated with a pathways 234 through the network. A pathway 234 may refer to a path that communication exchanges associated with an application interaction may take within the network. The path may connect the nodes associated with an application interaction (e.g., a start, an end node, an intermediary node, etc.) for the performance of various processes. In the above described example, a pathway for an application interaction between a first and second application associated with the first and second nodes, respectively, may be from the first node to the second node in the network. Furthermore, an application may have one or more application constraints 236 that may dictate the appropriate interactions or pathways taken with nodes of the network. The application constraints 236 may include but are not limited to: software, hardware, and/or bandwidth requirements; a need to be in a specific node, cluster, or geography; and/or a need to be performed under a certain time or time period.

The network devices database 238 may comprise a database, a repository, and/or a list of a plurality of network devices 240 in the network. The network devices may facilitate communication between the various nodes (e.g., clusters) of the network. Since pathways 234 of communication between nodes for the execution or performance of an application 230 may traverse network devices, each network device 240 may be associated with one or more pathways 242. Furthermore, each network device may have one or more hardware constraints 244 (e.g., bandwidth for the amount of data that can be received and/or transmitted, network connectivity, power consumed in the transfer of data, etc.), which may affect the application interactions relying on the network device.

The clusters database 246 may comprise a database, a repository, and/or a list of a plurality of clusters 248 in the network. As previously discussed, a cluster 248 may comprise a set of computers or computer systems assigned to perform a function or common set of functions. Such clusters 248 may rely on compute resources that are on premise, on cloud, or hybrid (e.g., a multi-access edge computing (MEC) cluster). In some embodiments, instead of a cluster, another type of compute node may be used in the network. Furthermore, the nodes and/or clusters may be assigned to (e.g., scheduled with) one or more applications (e.g., associated applications 250) for one or more respective processes of each application. During the optimization process described herein, the specific associated apps of each node and/or cluster may be modified, for example, to reduce power consumption and/or other resource usage. Furthermore, each cluster 246 may be associated with one or more constraints and/or capabilities (customer constraints/capabilities 252), which may include but are not limited to, software and/or hardware limitations, proximity to a premise or user base, a special function associated with the cluster, etc. The cluster constraints/capabilities may further dictate the appropriate pathways or associations for any given application and/or application interaction, for example, during an optimization process described herein.

The network orchestrator 202 may further comprise an update interface 254 and a linking engine 256. The update interface 254 may comprise any application, program, software, code, or plug-in used to allow an operator or an external system to update one or more databases or repositories of the network orchestrator 202 (e.g., the applications database 228, the network devices database 238, or the cluster database 248). The linking engine 256 may comprise a program, application, software, or code that may periodically form linkages or associations between one data entry or data structure (e.g., an application 230 and its interactions 232) with another data entry or data structure (e.g., associated applications 250 of a cluster 248).

Figure 3:
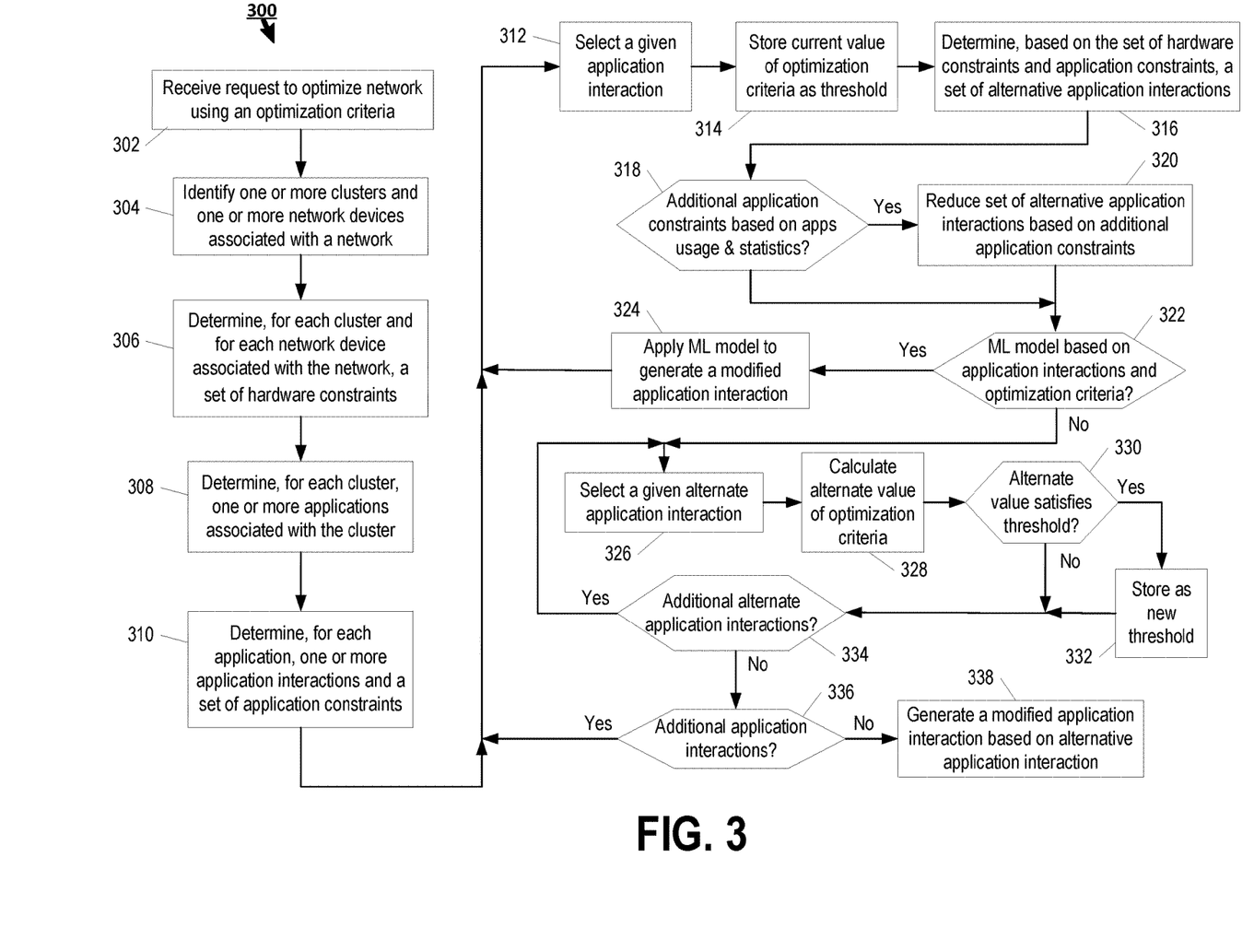
FIG. 3 is a flow chart illustrating an example process for optimizing application processes and interactions occurring across the network, according to an example embodiment of the present disclosure.

FIG. 3 is a flow chart illustrating an example process for optimizing application processes and interactions occurring across the network, according to an example embodiment of the present disclosure. In some embodiments, one or more blocks of process 200 may be performed by the network orchestrator 102/202 (e.g., via the processor 104/204 based on instructions stored in memory 106/206).

Process 300 may begin with the network orchestrator 102/202 receiving a request (e.g., optimization request 212) to optimize a network using an optimization criteria (e.g., optimization criteria 214). For example, the request may be received from a user device associated with a user or operator of the network or aspect of the network. Also or alternatively, the request may be received via the user interface 210 of the network orchestrator 202 based on input from the user or the operator. The optimization request 212 may identify the network, portion of the network, and/or aspect of the network desiring to be optimized and may include the optimization criteria 214. For example, the optimization criteria may be a power consumption, a performance metric, and/or a resource usage (e.g., bandwidth, processor capacity, memory used, carbon footprint, etc.) of the network. Also or alternatively, the optimization criteria may identify applications and/or application interactions occurring across the network that are requested to be optimized based on the above factors (e.g., power consumption, resource usage, performance metric, etc.).

At block 304, the network orchestrator 102/202 may identify one or more clusters and one or more network devices associated with the network (or the portion or aspect of the network that is requested to be optimized). For example, if the network requesting to be optimized is the network 100 shown in FIG. 1, the network orchestrator 102/202 may identify clusters 110, 120, and 130, and network devices 151-155.

At block 306, the network orchestrator 102/202 may determine, for each cluster and for each network device associated with the network, a set of hardware constraints. The set of hardware constraints may include but are not limited to: memory constraints (e.g., hard disk capacity or type, RAM capacity or type); processor constraints (e.g., CPU constraints, processor speed, number of cores, etc.); system architecture constraints; bandwidth constraints (e.g., for network devices), network connectivity, and/or operating system constraints. In some aspects, the network orchestrator 102/103 may also determine, for each cluster, unique capabilities (e.g., special-purpose computers or computing systems, unique software capabilities, access to unique resources, etc.).

At block 308, the network orchestrator 102/202 may determine, for each cluster, one or more applications associated with the cluster. For example, in the network 100 shown in FIG. 1, the network orchestrator 102/20 may determine that cluster 110 is associated with App 1 and App 2, cluster 120 is associated with App 3 and App 4, and cluster 130 is associated with App 5 and App 6. Such applications may comprise processes (e.g., workloads) that the cluster is assigned to execute, run, or otherwise implement. The association may be rendered as a result of an explicit definition of the application (e.g., where the application is tied to a certain cluster due to a unique capability of the cluster that pertains to the application), or the association may be actively assigned, scheduled, and/or configured. As previously discussed, even though an application may be associated with a given cluster, it is expected that the application may interact with other applications in other clusters for the fulfillment or completion of a process.

At block 310, the network orchestrator 102/202 may determine, for each application, one or more application interactions and a set of application constraints. For example, in the network 100 previous described in relation to FIG. 1, the network orchestrator 102/202 may determine that App 1 associated with cluster 110 interacts regularly with App 5 associated with cluster 130, thus forming an application interaction associated with App 1 and App 5 in their respective clusters. In some aspects, the application interaction between two applications (e.g., App 1 and App 5) may extend to involve additional applications (e.g., App 3).

In yet another embodiment, a given application (e.g., App 1 associated with cluster 110) may have two different interactions (e.g., an application interaction between App 1 and App 5 and another application interaction between App 1 and App 6), for example, depending on different functionalities of the application or different times or conditions of usage of the application. The set of application constraints may include requirements for hosting, facilitating, running, and/or executing the application. The requirements may include, for example, hardware and operating system requirements, system architecture requirements, bandwidth requirements, and connectivity requirements. In some aspects, application requirements may tie the application to clusters having a special capability (e.g., due to a special purpose machine in the cluster, geography of the cluster, or association of the cluster to a special type of human resources). In one embodiment, application requirements may be based on time or frequency by which the application may be executed or implemented.

In some embodiments, for each application interaction, the network orchestrator 102/202 may assess whether there may be alternate application interactions that are more optimal, with respect to the optimization criteria, and may then propose an application interaction that is most optimal. The assessment and modification of the application interaction to the most optimal application interaction may be an iterative process repeated for various application interactions associated with each application identified for each cluster (blocks 312 through 336). However, as an application interaction may involve two or more applications that may be associated with one or more clusters, the iterative process may be quicker and more efficient, as a result of being performed for each unique application interaction that is identified (e.g., from blocks 304 through 310).

For example, at block 312, a given application interaction may be selected for assessment. The selection may be random or based on a prescribed order. In one embodiment, the prescribed order may be based on the highest to lowest relevance of an application interaction to the optimization criteria (e.g., starting with an application interaction estimated to have the highest power consumption to ending with an application interaction having the lowest).

At block 314, the current value of the optimization criteria for that given application may be stored as a threshold. For example, if the optimization criterion is power consumption, the power currently consumed by that application interaction may be stored as a threshold. The power consumption may depend, for example, on the pathway of the interaction (e.g., which network devices the interaction traverses) and the hardware constraints of clusters associated with executing applications of the application interaction.

At block 316, the network orchestrator 102/202 may determine, based on the set of hardware constraints and application constraints, a set of alternative application interactions. For example, the network orchestrator 102/202 may determine, for each application involved in the application interaction, other clusters that can support, execute, and/or run the application to assess whether the application can be re-associated (e.g., reassigned) from its current cluster to any one of the said other clusters. Also or alternatively, the network orchestrator 102/202 may determine, for each pathway involved in the interaction between two or more applications, what other pathways may potentially deliver a more optimal interaction according to the optimization criteria. For example, with respect to network 100 previously described in relation to FIG. 1, if an interaction between App 1 and App 5 involved a pathway traversing network device 151 and network device 152, alternate pathways may involve network devices 153-155. In some embodiments, alternative application interactions may include interactions where a specific application of an application interaction is replaced with another more optimal interaction. For example, in the above described interaction between App 1 and App 5, if App 6 may deliver the same benefit to App 1 as App 5, then an alternate application interaction may involve the interaction between App 1 and App 6. The various alternative application interactions may be compiled as a set to assess their optimality in subsequent blocks.

At block 318, the network orchestrator 102/202 may determine whether there are any additional application constraints based on application usage statistics (e.g., apps usage statistics 218) for any of the applications involved in the application interaction. For example, the network orchestrator 102/202 may determine, based on historical patterns of usage of a given application involved in an application interaction that the said application is often used during a certain time period (e.g., nighttime). The knowledge that the said application is typically used during the certain time period (e.g., nighttime) may be treated as an application constraint in order to determine an optimal alternate application interaction. For example, an optimal alternate interaction may re-associate (e.g., reassign) the said application to a cluster located in a geography (e.g., in a time zone that is during work hours while the application's end users are in nighttime) that is conducive to the said application running during the certain time period. If there are additional application constraints, the set of alternate application interactions may be reduced based on the additional application constraints (block 320). For example, application interactions involving alternate clusters, alternate pathways, and/or alternate applications that do not meet the said application's additional constraints may be eliminated. Afterwards, or if there are no additional application constraints, the network orchestrator 102/202 may proceed to subsequent blocks (e.g., block 322).

For example, at block 322, the network orchestrator 102/202 may determine whether there is an applicable machine learning model based on the application interaction and the optimization criteria. As previously discussed, the network orchestrator 102/202 may store and/or continuously train machine learning models using training data concerning an optimization metric (e.g., the power usage, a resource usage, and/or performance) obtained from historical application interactions to determine an optimization metric (e.g., power usage, a resource usage, and/or a performance) associated with an alternative and/or a forecasted application interaction. For example, the training may comprise of feature vectors corresponding to historical application usage, statistics, interactions, and/or processes, which may be associated with (e.g., labeled to) an outcome (e.g., a power usage, a resource usage, a performance) to undergo supervised learning. If an applicable trained machine learning model exists, the trained machine learning model may be applied to generate a modified application interaction (block 324). The modified application interaction may thus be one of the alternate application interactions that the machine learning model identifies as being the most optimal based on the optimization criteria. Subsequently a new application interaction may be selected at block 312 to be assessed using blocks 312 through 324, as previously described.

If no applicable trained machine learning model exists, the network orchestrator 102/202 may selected a given alternate application interaction from the set of alternate application interactions for analysis of optimality (block 326). For example, at block 328, the network orchestrator 102/202 may calculate (e.g., using power usage calculator 224 and/or performance calculator 226) the value of the optimization criteria for the alternate application interaction (referred to herein as "alternate value of the optimization criteria"). If the alternate value satisfies a threshold (e.g., the threshold stored in block 314 for the current value of optimization criteria), then the alternate value of the optimization criteria may be stored as the new threshold for subsequent comparisons (block 332). Otherwise, or after the new threshold is set, the network orchestrator 102/202 may determine whether there are additional alternate application interactions from the set of alternate application interactions (block 334). If there are, another alternate application interaction may be selected at block 326 for the above described analysis.

If there are no more additional alternate application interactions for the application interaction selected at block 312, the network orchestrator 102/202 may determine whether there are additional application interactions to assess. If there are, another application interaction may be selected at block 312 for the above described analysis for alternate application interactions and optimality (blocks 312 through 334). If there are no more additional application interactions, the network orchestrator 102/202 may, at block 338, generate a modified application interaction based on the alternative application interaction (e.g., corresponding to the most recent threshold stored at block 332). Depending on what the alternate application interaction entails (e.g., an alternate pathway, a reassignment of an application to a better suited cluster, a substitution of an application with a new application in an application interaction involving two or more applications, etc.), the modified application interaction may incorporate the change in the alternate application interaction accordingly. The modified application interaction can thus result in the most optimal values for the optimization criteria requested. For example, if the optimization criteria concerned performance, and if modified application interaction involved a reassignment of an application from its current cluster (first cluster) to another cluster (second cluster), the second cluster may be found to support, execute, or run the application of the application interaction better than the first cluster based on the hardware constraints of the second cluster being more compatible with the application constraints of the application. Also or alternatively, if the optimization criteria concerns power consumption, the network orchestrator 102/202 may determine, for example, that in the modified application interaction, an alternate pathway for the interaction consumes less power than the pathway used prior to the modification.

Figure 4:
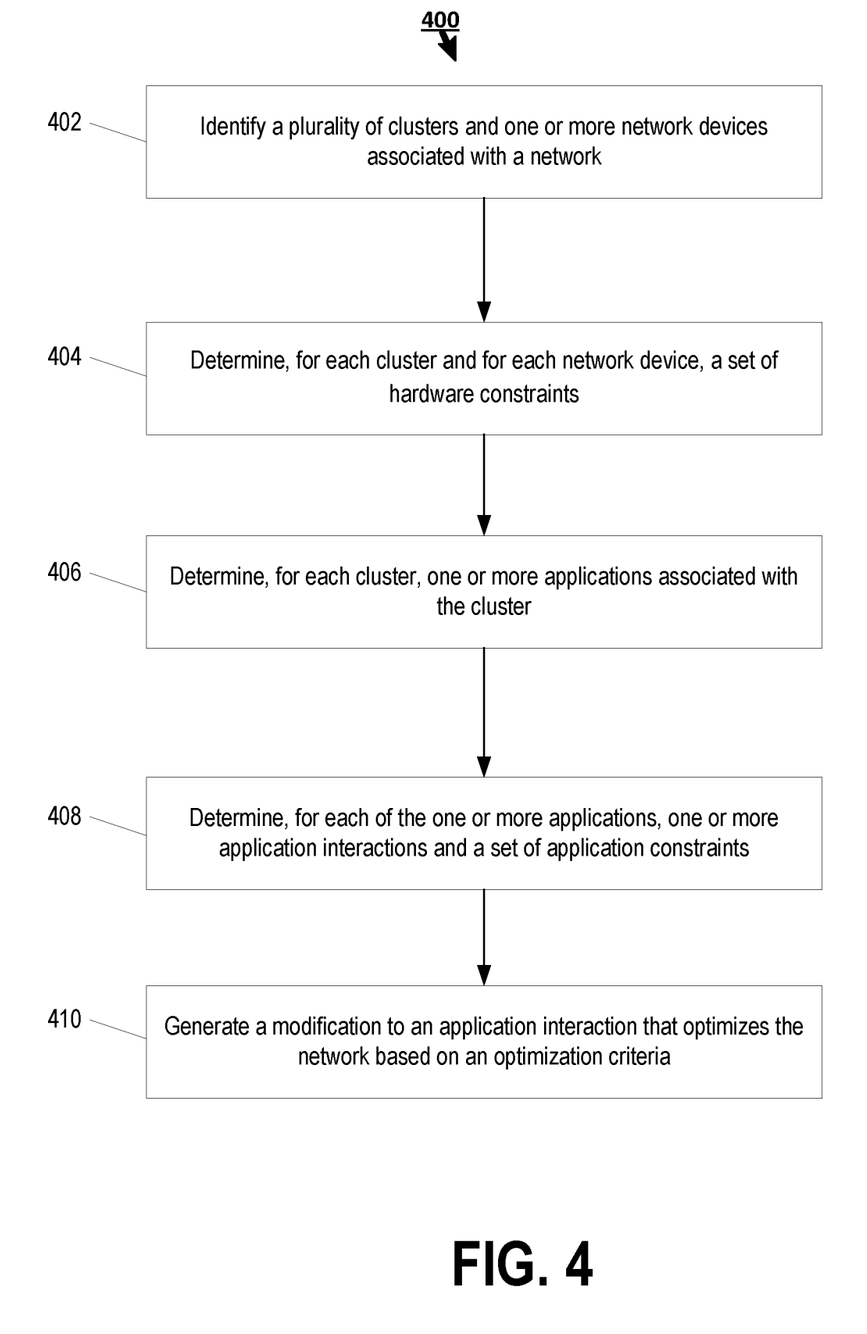
FIG. 4 is a flow chart illustrating an example process for optimizing the network based on an optimization criteria using a modification to an application interaction, according to an example embodiment of the present disclosure.

FIG. 4 is a flow chart illustrating an example process for optimizing the network based on an optimization criteria using a modification to an application interaction, according to an example embodiment of the present disclosure. In some embodiments, one or more blocks of process 400 may be performed by the network orchestrator 102/202 (e.g., via the processor 104/204 based on instructions stored in memory 106/206). Also or alternatively, one or more blocks of process 400 may be performed by another cluster, computing system or device associated with a node, or a computing system or device associated with a user or operator requesting optimization of the network. For simplicity, the performer of various blocks of process 400 may be referred to as a computing device having a processor (e.g., processor 104/204) that can execute instructions stored in memory (e.g., memory 106/206).

Process 400 may begin with the computing device (e.g., network orchestrator 102/202) identifying a plurality of clusters and one or more network devices associated with a network (block 402). The clusters and network devices may be associated with a network for which optimization is being sought. The optimization may be based on an optimization criteria (e.g., optimization based on power consumption, a resource usage, performance, etc.). In some aspects, the computing device may identify any nodes associated with the network (e.g., in addition to or alternatively to clusters and network devices). In some embodiments, the computing device may have previously received a request to optimize one or more application processes in the network based on the optimization criteria.

At block 404, the computing device (e.g., network orchestrator 102/202) may determine, for each cluster and network device, a set of hardware constraints. The set of hardware constraints may include but are not limited to: memory constraints (e.g., hard disk capacity or type, RAM capacity or type); processor constraints (e.g., CPU constraints, processor speed, number of cores, etc.); system architecture constraints; bandwidth constraints (e.g., for network devices), network connectivity, and/or operating system constraints. In some aspects, the network orchestrator 102/103 may also determine, for each cluster, unique capabilities (e.g., special-purpose computers or computing systems, unique software capabilities, access to unique resources, etc.).

At block 406, the computing device (e.g., network orchestrator 102/202) may determine, for each cluster, one or more applications associated with the cluster. In some aspects, an association of any given application with any given cluster provides the given cluster an authority to execute the given application. For example, in the network 100 shown in FIG. 1, the network orchestrator 102/20 may determine that cluster 110 is associated with App 1 and App 2, cluster 120 is associated with App 3 and App 4, and cluster 130 is associated with App 5 and App 6. Such applications may comprise processes (e.g., workloads) that the cluster is assigned to execute, run, or otherwise implement.

At block 408, the computing device (e.g., network orchestrator 102/202) may determine, for each of the one or more applications, one or more application interactions and a set of application constraints. The one or more application interactions may occur between applications associated with different clusters. Furthermore, the one or more application interactions may include one application interaction (first application interaction) between one application (first application) associated with one cluster (first cluster) and another application (second application) associated with another cluster (second cluster) in the network.

At block 410, the computing device (e.g., network orchestrator 102/202) may generate a modification to an application interaction that optimizes the network based on the optimization criteria. In some embodiments, in order to generate the modification, the computing device may identify a set of alternative application interactions for the first application. Each alternative application interaction may include, for example: a proposed interaction between the first application and another application; a reassignment of the first application from having an association with the first cluster to having an association with another cluster; and/or a reassignment of a pathway associated with the first application interaction, wherein the pathway traverses a set of network devices. In some embodiments, the set of alternative application interactions may be identified using a machine learning model (e.g., a trained ML model 222 of the optimization unit 216). The computing device may generate, from the set of alternative application interactions, an application interaction that optimizes the network based on the optimization criteria.

Thus, the modification may result in the maximization of the benefit associated with the optimization criteria. For example, the modification may cause a reduction of power consumed by the network, or an enhancement of a performance metric of one or more application processes in the network. In some embodiments, the modification may reassign the first application from having an association with the first cluster to having an association with the second cluster (e.g., due to the constraints and capabilities of the second cluster having better synergies with the application constraints of the first application). Also or alternatively, the modification may reassign a pathway corresponding to the first application from a first pathway to a second pathway. The first pathway may traverse a first set of network devices of the network and the second pathway may traverse a second set of network devices of the network that is different from the first set of network devices.

Figure 5:
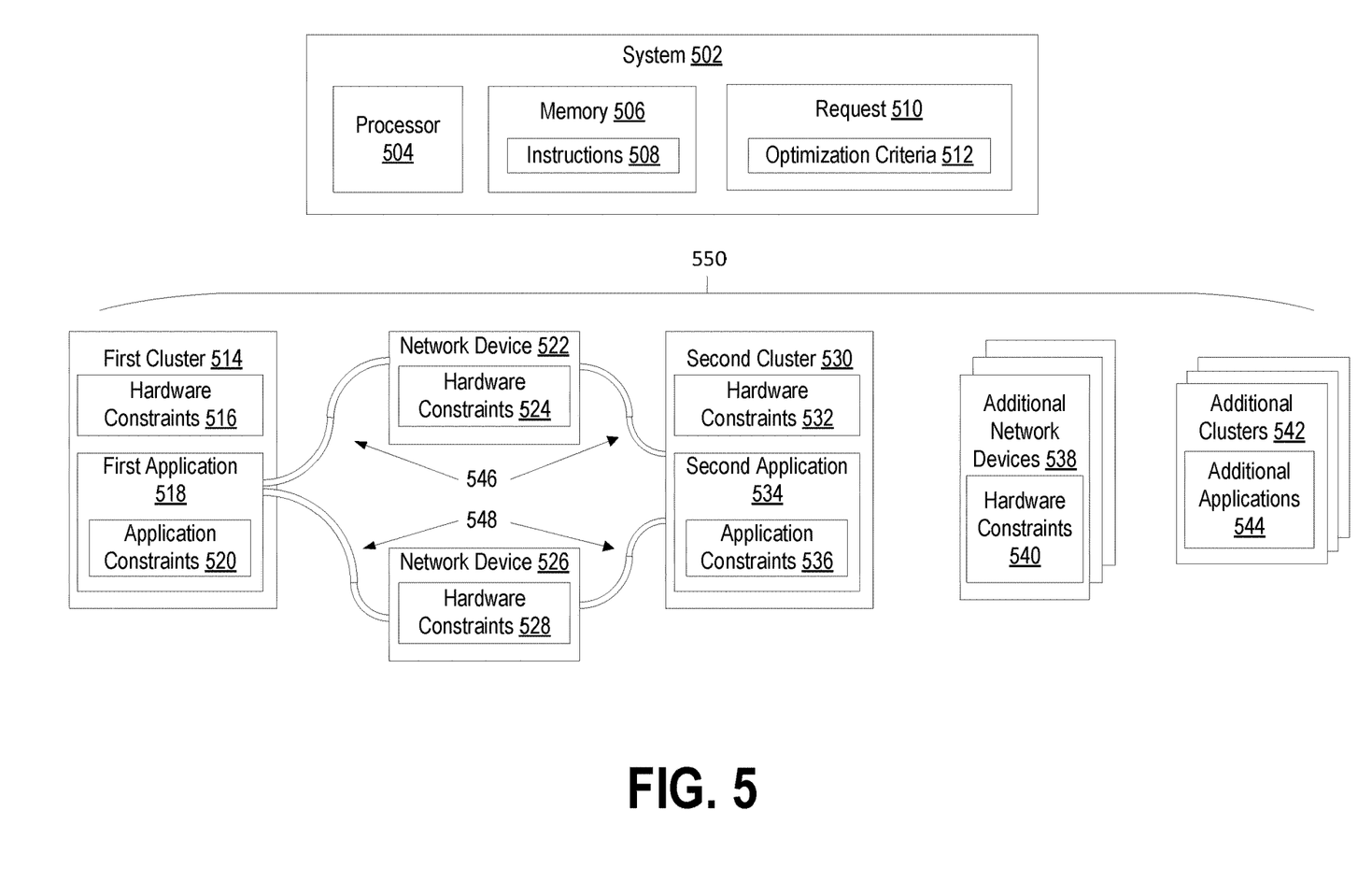
FIG. 5 is a block diagram showing one or more components of a system for optimization of a network based on the scheduling of applications across the network, according to an example embodiment of the present disclosure.

FIG. 5 is a block diagram showing one or more components of a system 502 for optimization of a network 550 based on the scheduling of applications across the network, according to an example embodiment of the present disclosure. As shown in FIG. 5, the system 502 may include a processor 504 and a memory 506. The memory 506 may store instructions 508 that, when executed by the processor 504, can cause the processor 504 to perform one or more processes described herein. For example, the processor 504 may identify a plurality of clusters (e.g., first cluster 514, second cluster 530, and additional clusters 542) and one or more network devices (e.g., network device 522, network device 526, and additional network devices 528) associated with a network 550. For each of the plurality of clusters and for each of the one or more network devices, the processor 504 may determine a set of hardware constraints (e.g., hardware constraints 516, 524, 528, 532, and 540). For each cluster, the processor may determine one or more applications associated with the cluster (e.g., first application 518 for first cluster 514, second application 534 for second cluster 530, and additional applications 544 for additional clusters 542).

For each of the one or more applications associated with each cluster, the processor 504 may determine one or more application interactions and a set of application constraints (e.g., application constraints 520 and 536). Furthermore, the one or more application interactions occur between applications associated with different clusters. The one or more application interactions may include a first application interaction between a first application 518 associated with a first cluster 514 and a second application 534 associated with a second cluster 530. The instructions 508, when executed, may further cause the processor 504 to generate a modification to the first application interaction. The modification may optimize the network based on an optimization criteria 512. For example, the modification may reassign a pathway corresponding to the first application interaction from a first pathway 546 to a second pathway 548. As shown in FIG. 5, the first pathway traverses a first set of network devices (e.g., network device 522), whereas the second pathway 548 traverses a second set of network devices (e.g., network device 526) that is different from the first set of network devices. Also or alternatively, the modification may reassign the first application 518 from having the association with the first cluster 514 to having an association with the second cluster 530. In some embodiments, prior to identifying the plurality of clusters and the one or more network devices, a request 510 to optimize one or more application processes in the network 550 based on the optimization criteria 512 may be received. The request 510 may include the optimization criteria 512. The optimization criteria 512 may include, for example an optimization of a performance of one or more application processes in the network; and/or an optimization of power consumption caused by the one or more application processes in the network.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is as follows:

1. A system for network optimization, the system comprising:
    a processor; and
    a memory storing instructions that, when executed by the processor, cause the processor to:
        identify a plurality of clusters and one or more network devices associated with a network;
        determine, for each cluster, one or more applications associated with the cluster;
        determine, for an application of the one or more applications associated with a cluster of the plurality of clusters, one or more application interactions, wherein the one or more application interactions occur between the application associated with the cluster and other applications associated with other clusters of the plurality of clusters;
        store a threshold, the threshold being a current value of an optimization criteria for the application;
        for each application interaction of the one or more application interactions:
            determine a set of alternative application interactions;
            for each alternative application interaction of the set of alternative application interaction:
                calculate an alternate value of the optimization criteria using the alternative application interaction; and
                upon determining that the alternate value satisfies the threshold, update the threshold and compare a next calculated alternate value to the updated threshold; and
        generate a modification to each application interaction of the one or more application interactions, wherein the modification optimizes the network using the alternative application interaction corresponding to a most recent update to the threshold.

2. The system of claim 1, wherein each of the one or more application interactions are used to execute an application process, and wherein the instructions, when executed, further cause the processor to, prior to identifying the plurality of clusters and the one or more network devices,
    receive a request to optimize one or more application processes in the network based on the optimization criteria.

3. The system of claim 2, wherein the optimization criteria comprises one or more of:
    an optimization of a performance of one or more application processes in the network; or
    an optimization of power consumption caused by the one or more application processes in the network.

4. The system of claim 1, wherein an association of any given application with any given cluster provides the given cluster an authority to execute the given application.

5. The system of claim 1, wherein modification causes one or both of:
    a reduction of power consumed by the network, or
    an enhancement of a performance metric of one or more application processes in the network.

6. The system of claim 1, wherein the cluster of the plurality of the clusters is a first cluster, and wherein the modification reassigns the application from having the association with the first cluster to having an association with a second cluster of the plurality of clusters.

7. The system of claim 1, wherein the modification to an application interaction of the one or more application interactions reassigns a pathway corresponding to the application and the application interaction, wherein the pathway is between the application associated with the cluster and a second application associated with a second cluster of the plurality of clusters, wherein the pathway is reassigned from a first pathway to a second pathway, wherein the first pathway between the first cluster and the second cluster traverses a first set of network devices of the network and the second pathway between the first cluster and the second cluster traverses a second set of network devices of the network that is different from the first set of network devices, the first set of network devices includes a starting point device, an intermediate device, and an endpoint device, and wherein the second pathway consumes less power than the first pathway.

8. The system of claim 1, wherein the instructions, when executed, further causes the processor to
    identify the set of alternative application interactions for the application, wherein each alternative application interaction comprises one or more of:
        a proposed interaction between the application and another application;
        a reassignment of the application from having an association with the cluster to having an association with another cluster; or
        a reassignment of a pathway associated with each of the one or more application interactions; and
    determine, from the set of alternative application interactions, an application interaction that optimizes the network based on the optimization criteria.

9. The system of claim 1, wherein the set of alternative application interactions is identified using a machine learning model.

10. A method for network optimization comprising:
identifying, by a computing device having a processor, a plurality of clusters and one or more network devices associated with a network;
determining, for each cluster, one or more applications associated with the cluster;
determining, for an application of the one or more applications associated with a cluster of the plurality of clusters, one or more application interactions, wherein the one or more application interactions occur between the application associated with the cluster and other applications associated with other clusters of the plurality of clusters;
storing a threshold, the threshold being a current value of an optimization criteria for the application;
for each application interaction of the one or more application interactions:
determining a set of alternative application interactions;
for each alternative application interaction of the set of alternative application interactions:
calculating an alternate value of the optimization criteria using the alternative application interaction; and
upon determining that the alternate value satisfies the threshold, updating the threshold and comparing a next calculated alternate value to the updated threshold; and
generating a modification to each application interaction of the one or more application interactions, wherein the modification optimizes the network using the alternative application interaction corresponding to a most recent update to the threshold.

11. The method of claim 10, wherein each of the one or more application interactions are used to execute an application process, and wherein the method further comprises, prior to identifying the plurality of clusters and the one or more network devices,
receiving a request to optimize one or more application processes in the network based on the optimization criteria.

12. The method of claim 11, wherein the optimization criteria comprises one or more of:
an optimization of a performance of the one or more application processes in the network; or
an optimization of power consumption caused by the one or more application processes in the network.

13. The method of claim 10, wherein an association of any given application with any given cluster provides the given cluster an authority to execute the given application.

14. The method of claim 10, wherein the modification causes one or both of:
a reduction of power consumed by the network, or
an enhancement of a performance metric of one or more application processes in the network.

15. The method of claim 10, wherein the cluster of the plurality of the clusters is a first cluster, and wherein the modification to an application interaction of the one or more application interactions reassigns the application from having an association with the first cluster to having an association with a second cluster of the plurality of clusters.

16. The method of claim 10, wherein the modification to an application interaction of the one or more application interactions reassigns a pathway corresponding to the application from a first pathway to a second pathway, wherein the first pathway traverses a first set of network devices of the network and the second pathway traverses a second set of network devices of the network that is different from the first set of network devices.

17. The method of claim 10, further comprising:
identifying the set of alternative application interactions for the application, wherein each alternative application interaction comprises one or more of:
a proposed interaction between the application and another application;
a reassignment of the application from having an association with the cluster to having an association with another cluster; or
a reassignment of a pathway associated with each of the one or more application interactions, wherein the pathway associated with each of the one or more application interactions traverses a set of network devices; and
generating, from the set of alternative application interactions, an application interaction that optimizes the network based on the optimization criteria.

18. The method of claim 10, wherein the set of alternative application interactions is identified using a machine learning model.

19. A non-transitory, computer-readable medium storing instructions which, when executed by a processor, cause the processor to:
identify a plurality of clusters and one or more network devices associated with a network;
determine, for each cluster, one or more applications associated with the cluster;
determine, for an application of the one or more applications associated with a cluster of the plurality of clusters, one or more application interactions, wherein the one or more application interactions occur between the application associated with the cluster and other applications associated with other clusters of the plurality of clusters;
store a threshold, the threshold being a current value of an optimization criteria for the application;
for each application interaction of the one or more application interactions:
determine a set of alternative application interactions;
for each alternative application interaction of the set of alternative application interactions:
calculate an alternate value of the optimization criteria using the alternative application interaction; and
upon determining that the alternate value satisfies the threshold, update the threshold and compare a next calculated alternate value to the updated threshold; and
determine a modification to each application interaction of the one or more application interactions, wherein the modification optimizes the network using the alternative application interaction corresponding to a most recent update to the threshold.

20. The non-transitory, computer-readable medium of claim 19, wherein each of the one or more application interactions are used to execute an application process, and wherein the instructions, when executed, further cause the processor to:
receive a request to optimize one or more application processes in the network based on the optimization criteria, wherein the optimization criteria comprises one or more of:

an optimization of a performance of the one or more application processes in the network; or an optimization of power consumption caused by the one or more application processes in the network.

\* \* \* \* \*